United States Patent [19]
Beard et al.
[11] 3,818,460
[45] June 18, 1974

[54] EXTENDED MAIN MEMORY ADDRESSING APPARATUS

[75] Inventors: Albert LeMessurier Beard, Phoenix; John Francis Couleur, Scottsdale; Ronald Edwin Lange; Robert Frank Montee, both of Phoenix; Richard Leroy Ruth, Paradise Valley, all of Ariz.

[73] Assignee: Honeywell Information Systems, Inc., Waltham, Mass.

[22] Filed: Dec. 29, 1972

[21] Appl. No.: 319,575

[52] U.S. Cl. .............................................. 340/172.5
[51] Int. Cl. ...... G06f 9/20, G06f 9/10, G05b 19/28
[58] Field of Search .................................. 340/172.5

[56] References Cited

UNITED STATES PATENTS

| | | | |
|---|---|---|---|
| 3,351,909 | 11/1967 | Hummel | 340/172.5 |
| 3,380,025 | 4/1968 | Ragland | 340/172.5 |
| 3,400,380 | 9/1968 | Packard et al. | 340/172.5 |
| 3,431,558 | 3/1969 | Capozzi | 340/172.5 |
| 3,445,818 | 5/1969 | Yen | 340/172.5 |
| 3,553,653 | 1/1971 | Krock | 340/172.5 |
| 3,657,705 | 4/1972 | Mekota et al. | 340/172.5 |
| 3,713,108 | 1/1973 | Edstrom et al. | 340/172.5 |

*Primary Examiner*—Raulfe B. Zache
*Assistant Examiner*—Jan E. Rhoads
*Attorney, Agent, or Firm*—Edward W. Hughes; Henry K. Woodward

[57] ABSTRACT

An extended addressing mechanism is disclosed for a digital computer system in which absolute addresses are generated over a span which exceeds the address span that can be generated by the address field of the computer instructions. For user slave programs, the regular base address register is augmented by an extended base address register. For operating system master mode programs, two master base address registers are provided, one for general purpose address augmentation and the other for special accumulator load/store instructions. In order to enable transformation of effective addresses to absolute addresses, special addition logic and control logic are also provided and combined so that effective addresses are selectively augmented or not, without increasing the time for preparation of the absolute address.

6 Claims, 8 Drawing Figures

MEMORY
10
ADDR. REG.
76
ZD SWCH.
32
ADDRESS PREPARATION
80
ZDI SWCH.
11
ZA SWCH.
13
ZP SWCH.
12
M REG.
14
ZJ SWCH.
20
ZQ SWCH.
42
H REG.
36
N REG.
40
ZH SWCH.
37
ZN SWCH.
41
A ADDER
38
AS REG.
55
ZF SWCH.
34
ZU SWCH.
16
ZC SWCH.
27
ZL SWCH
48
E REG.
30
D REG.
22
ACT REG.
28
AQ REG.
56
ZE SWCH.
25
ZG SWCH.
26
ZR SWCH.
46
E ADDER
34

EXTENDED MAIN MEMORY ADDRESSING APPARATUS

FIELD OF THE INVENTION

This invention relates to an address formation subsystem for an electronic digital computer system. The computer system employs a basic instruction format having an address field, an operation code field and a tag field. The invention expands the span of the address field space beyond the span of the instruction address field for both operands and instructions.

DESCRIPTION OF THE PRIOR ART

Particularly for large computer systems which support a high level of multiprogramming, it is often desirable to support an extended range of main memory. For example, with an instruction format in which the address field has 18 bits, the span of addresses which can be specified is 256K words (where *K* is equal to 1,024). As data processing loads increase, it becomes more desirable to address several million words. In general, this requirement implies the use of an auxiliary register for extending the address span, where the auxiliary register has a greater capacity than the address field span. The addresses formed include operand addresses, user program instruction addresses and operating system instruction addresses.

A primary concern of an extended address design is that it should be as compatible as possible with prior and future computer systems and operating systems. That is, it should require a minimum amount of change in hardware and software which does not have an extended addressing capability. A related consideration is that an extended address design should have a minimal effect on computer system timing. The design should not impact the operand and instruction address formation procedures significantly in respect to time. The amount of time allowed by hardware (or firmware) for taking an operand address or instruction address and putting it into an absolute address form appropriate for the memory address register should not be increased. This retains hardware compatibility and maintains computer speed.

A special problem exists for operating systems which may have routines in any part of main memory and which may make reference to locations in any other part of main memory. It is also common for a segment of the operating system associated with a user program to reference routines in the hard core monitor (that portion of the operating system which is permanently resident in main memory where the operating system segment and the hard core monitor routine addresses in main memory differ by an amount exceeding the address span of the computer's instruction address field. Here too it is important that the address formation time be not increased.

Accordingly, it is an object of the invention to provide apparatus for extended addressing which is compatible with processors not having an extended address capability.

It is a further object of the invention to provide extended addressing apparatus which does not increase the address preparation time.

SUMMARY OF THE INVENTION

In a digital computer designed to have operand addresses specified by an instruction address field and having a compatible instruction count register, a mechanism is provided which extends the span of the addressable absolute memory for both operating system programs and user programs. The base address register for user programs is augmented by an extension register and a pair of master base registers are provided to modify operating system program addresses. The control logic for address formation and the addition logic for generating extended absolute addresses are combined so that the computer time required for absolute address generation is not extended. For operating system procedures, transfers between core resident monitor software and particular routines within the extended main memory are effected by the use of certain bits in the address field without requiring any base address register storing or modification.

DESCRIPTION OF A PREFERRED EMBODIMENT OF THE INVENTION

Figure 1:
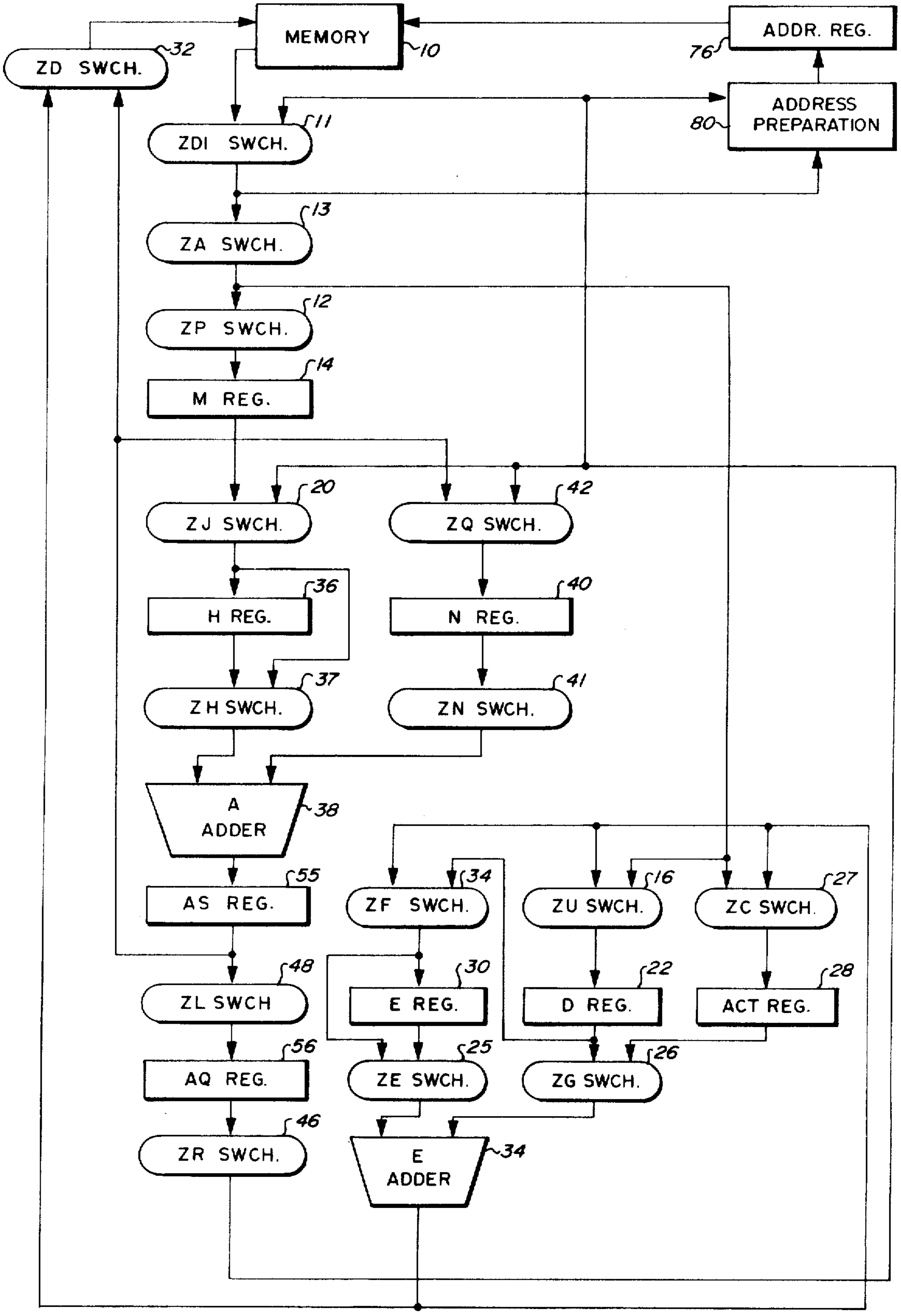
FIG. 1 is a block diagram of a preferred embodiment of the invention, illustrating registers, switches and adders constituting an operations unit for a binary, 2's complement, digital computer.

FIG. 1 illustrates the major components required for the arithmetic unit and interconnections for implementing the present invention in a preferred embodiment. For a more complete description of the data processing system, reference is made to U.S. Pat. No. 3,413,613, "Reconfigurable Data Processing System," D. L. Bahrs, et al., issued Nov. 26, 1968, and Pat. application Ser. No. 140,437, "Rounding Numbers Expressed in 2's Complement Notation," filed May 5, 1971, by J. L. Kindell, et al.

A main memory 10 directs data words and instruction words through ZDI switch 11 to the address preparation unit 80 and ZA switch 13. The memory address is obtained from address register 76. The memory address is formed by address preparation unit 80, using the contents of I register 78 and register 76, using the contents of I-register 78 and P-register 76. A pair of data words is gated by the ZA switch 13 and ZP switch 12 to a 72 bit M-register 14. ZJ switch 20 selectively connects data words from the M-register to a 72-bit H-register 36, one of the pair of operand registers for the main A-adder 38. The second operand register is a 72-bit N-register 40 which is loaded from ZQ switch 42. The A-adder is a 72-bit full adder which performs selectively the arithmetic operations of addition and subtraction on 2's complement numbers and the logical operations of OR, AND, and exclusive OR. The inputs to the A-adder are selected by ZH gate 37, having as one first operand input the H-register 36, and by ZN gate 41, having as one second operand input the N-register 40. The output of the A-adder is stored in a 72-bit AS register 55 and can be selectively gated to the N-register by ZQ switch 42. The contents of the AS register are selectively gated for storage in memory or a 72-bit accumulator, AQ register 56, by ZD switch 32 and ZL switch 48, respectively. Through ZR switch 46, the accumulator contents are selectively gated to the H- or N-registers by ZJ switch 20 and ZQ switch 42.

Exponent portions of words from the memory 10 which pass through ZDI switch 11 are also selectively gated, right justified, to a 10-bit D-register 22 by ZU switch 16, for the purpose of separating an exponent from a floating point number, or gated to a 10-bit ACT register 28 by ZC switch 27, for the purpose of maintaining shift counts and the like. An exponent E-adder 34 is provided for performing exponent processing and auxiliary functions. Inputs to the exponent adder are taken from ZE switch 25 and ZG switch 26. The output of the exponent adder is connected to ZF switch 24, ZU switch 16, and ZC switch 27. The ZF switch gates operands from the D-register and exponent adder outputs to an E-register 30.

The apparatus shown in FIG. 1 consists of a combination of switches, registers and adders. The particular implementation of these devices is not material to the present invention. To implement the A-adder 38 it is sufficient to use 72 full adders, each adder having as inputs a bit from the corresponding bit position in each operand applied thereto and a carry-in from the next less significant full adder. In practice, the adder is preferably modified to reduce carry propagation time by carry-look-ahead logic, conditional sum logic, etc., in accordance with the desired processor performance. The registers are conveniently DC gated by control signals. The switches are comprised of a set of parallel logic gate stages such as gates 61–65 shown in FIG. 4.

Figure 2:
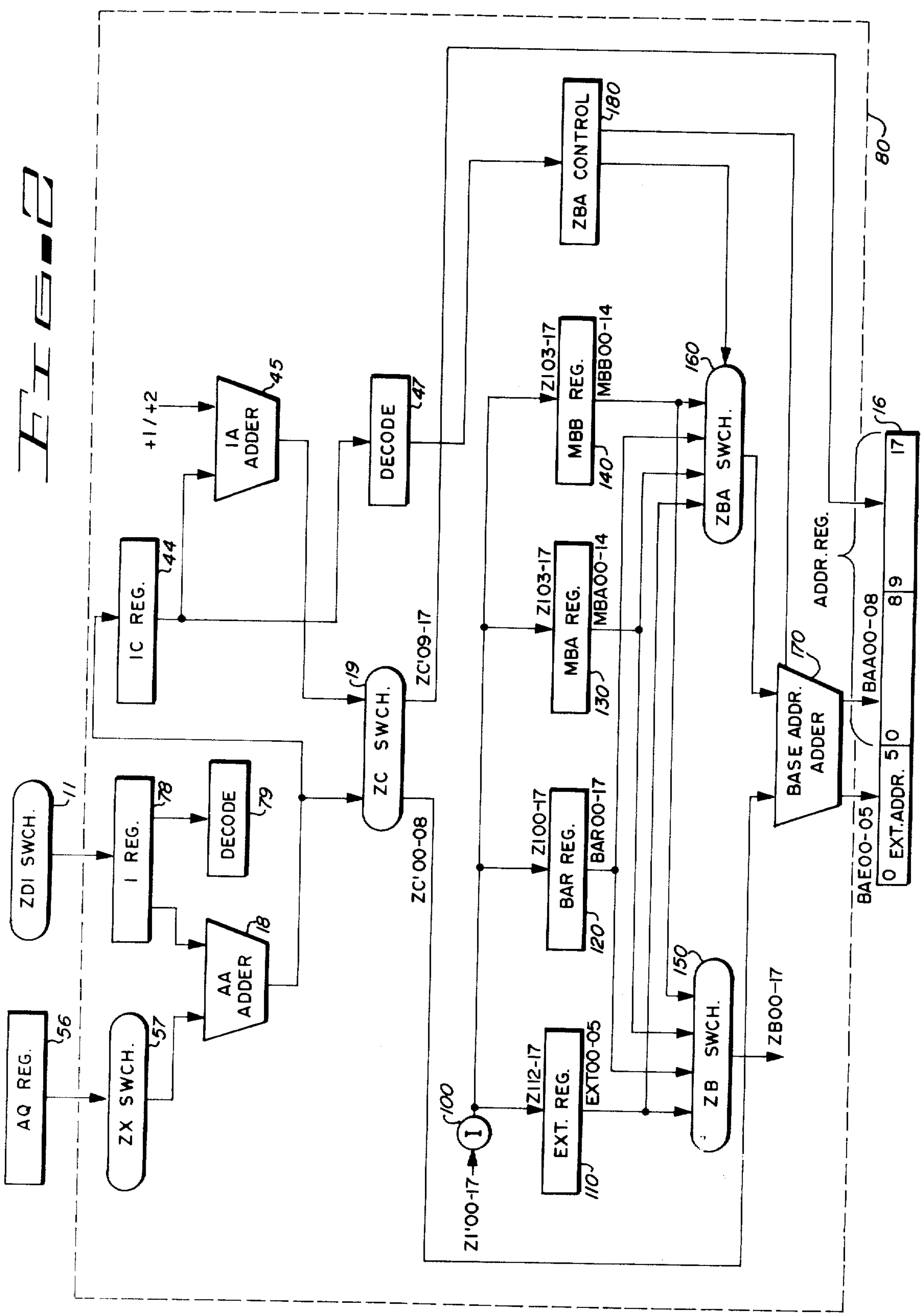
FIG. 2 is a block diagram of the address preparation logic unit of FIG. 1.

In FIG. 2, the extended address preparation unit 80 is shown in block diagram form. In addition to the basic base address register 120, three additional address preparation registers are provided: a base extension register 110 for extending the span of base address register 120, a first auxiliary base (MBA) register 130, and a second auxiliary base (MBB) register 140. The extension register 110 has a capacity of six bits and the auxiliary registers 130 and 140 each have a capacity of 15 bits. Because the latter are adapted to address memory in modules of 512 words, the address span is extended to 16,384K words of memory. Each of these registers are loaded from a common bus $ZI_{0-17}$ by ZDI switch 11 in accordance with respective load instructions. All of these registers are connected to a register selecting ZBA switch 160. The address preparation, base address adder 170 is responsive to inputs from the ZBA switch and ZC switch. The base address adder 170 generates either the sum of the input operands or the ZC operand unmodified, in accordance with the ZBA control logic 180. The ZC operand is derived from instruction I register 78 or the instruction IC counter register 44. The address from the instruction register is selectively indexed by AA adder 18 which receives its second input from ZX switch 57 that selects an input from registers such as AQ register 56. The output address signal from the instruction counter register 44 is selectively incremented by IA adder 45.

In practice, at a given time, a processor is either executing a user slave program instruction or an operating system master mode program instruction. When it is executing a slave program, the instruction and operand addresses are modified by the base address register in all cases. When the processor is executing master mode programs, the instruction and operand addresses are normally modified by the master base address register MBA, if the original address is 32K or larger. However, if a special master mode accumulator load/store operation is specified in the instruction operation code, then the master mode base address register MBB is added to the operand address.

Figure 3:
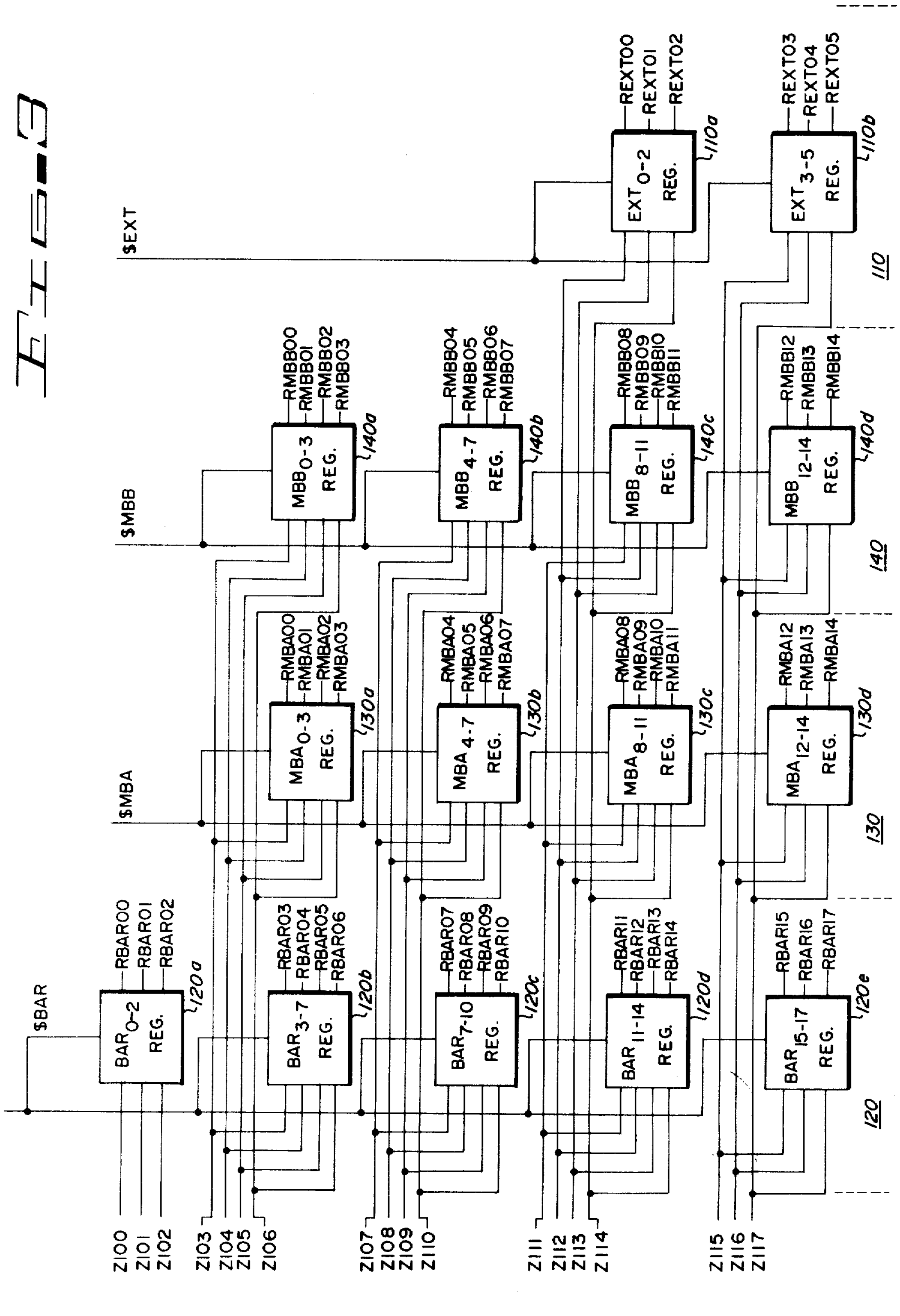
FIGS. 3–6 are logic diagrams of an implementation of the address preparation logic unit of FIG. 2.

The BAR register 120, MBA register 130, MBB register 140 and EXT register 110 are shown in greater detail in FIG. 3. A common set of address lines ZI00–ZI17 from ZDI switch 11 and inverters 100 are connected to the registers. The BAR register 120 is comprised of elements 120A–E, each of which is a four input-four output latching device that is gated by the SBAR signal. One input-output pair in both elements 120A and 120E is not used because storage of 18 bits for this register are sufficient. The outputs of BAR register 120 are designated RBAR00–RBAR17. In a similar manner, MBA registers 130 and 140 are comprised of latch elements 130A–D and 140A–D, and they generate signals RMBA00–RMBA14 and RMBB00–RMBB14, respectively. Also, the EXT register 110 is comprised of elements 110A and 110B, and it generates signals REXT00–REXT05.

Figure 4:
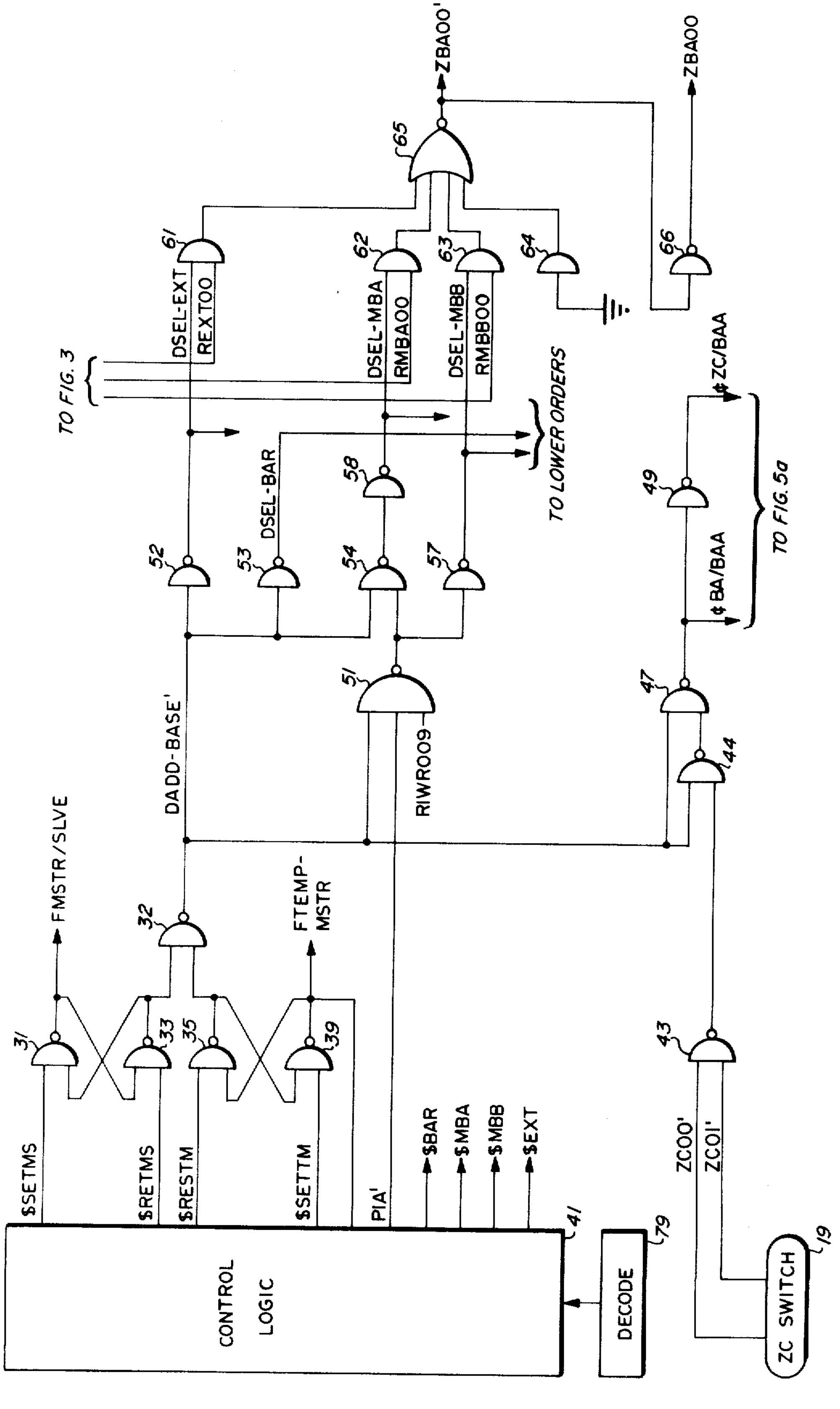
Figure 5A:
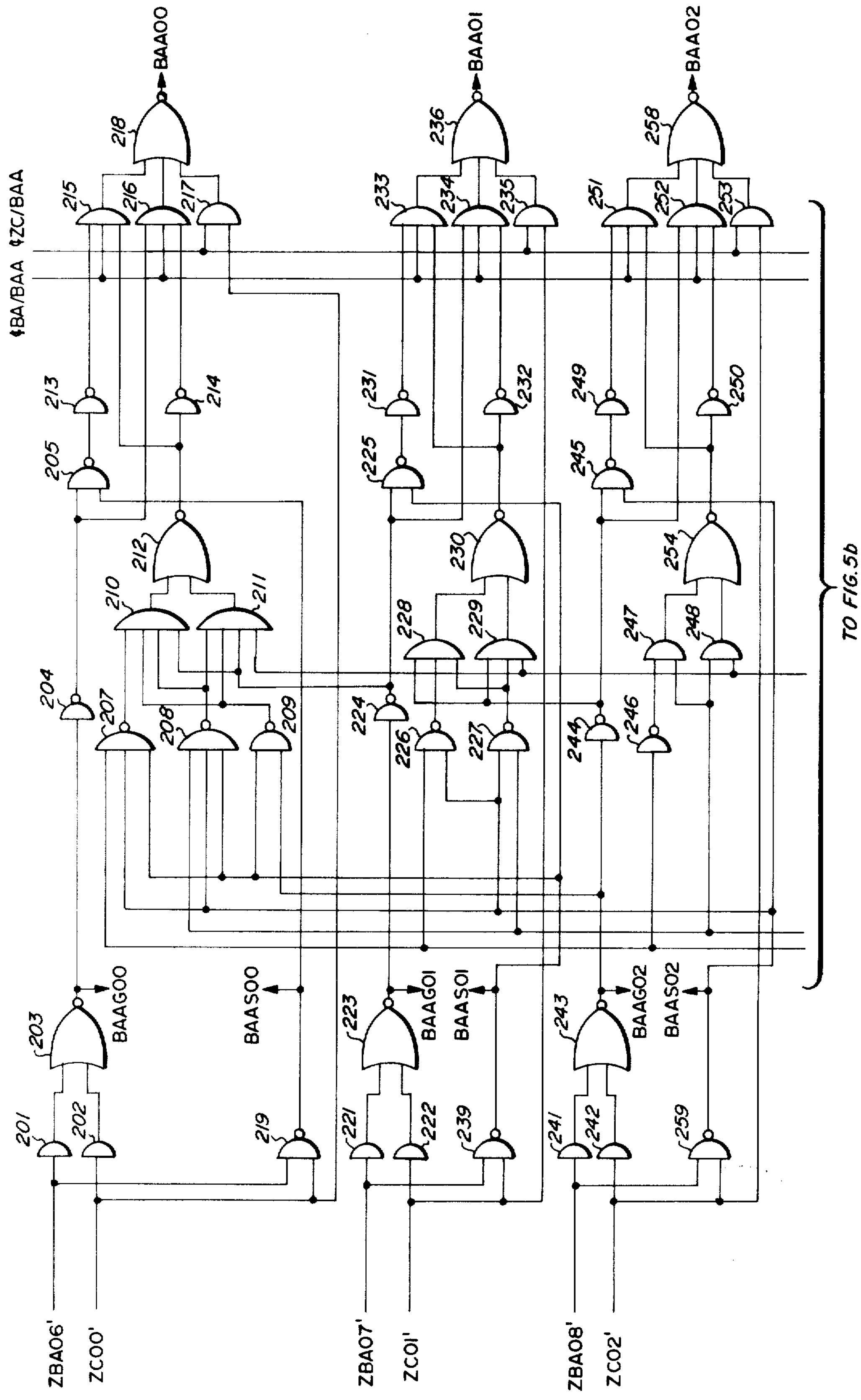
Figure 5B:
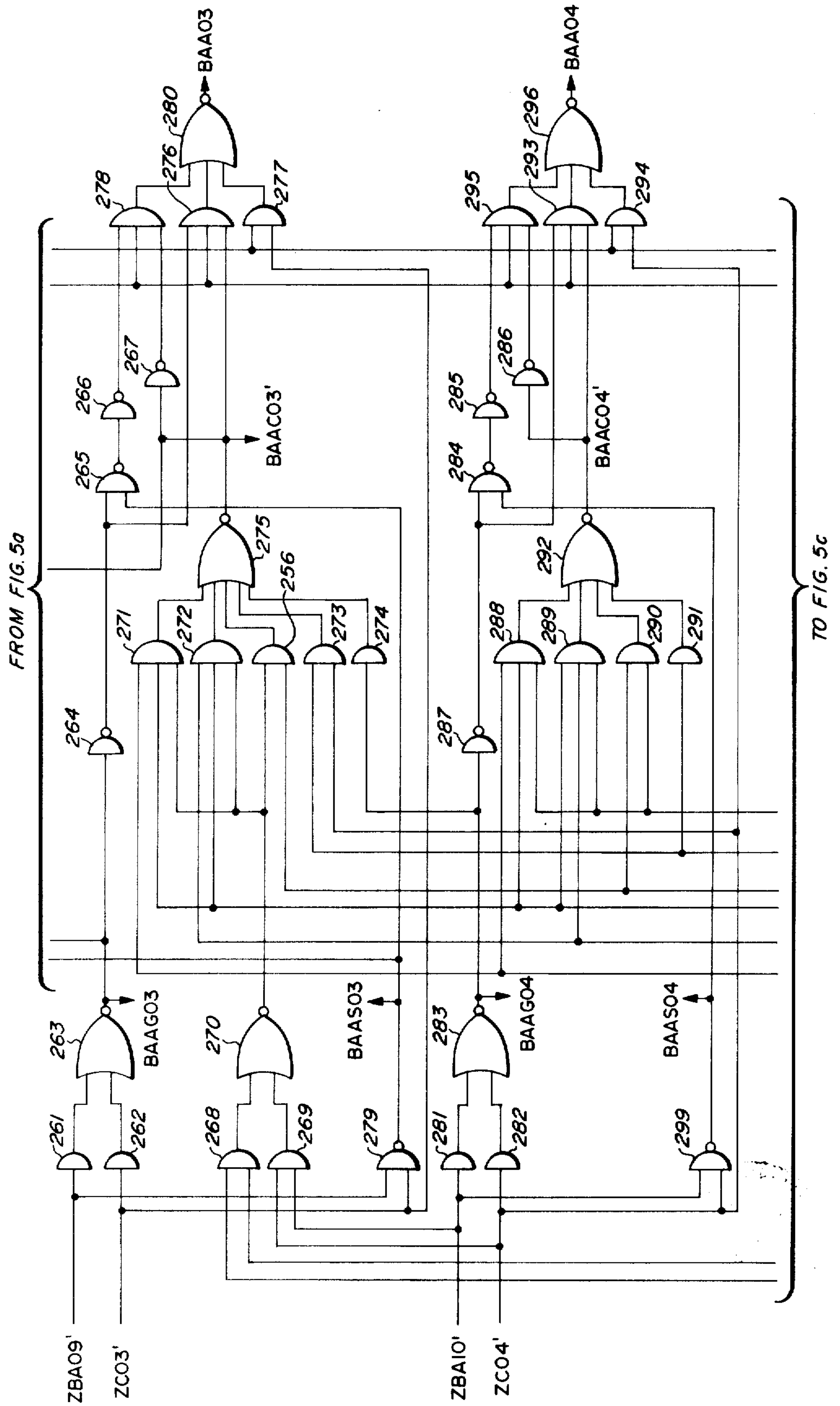
Figure 5C:
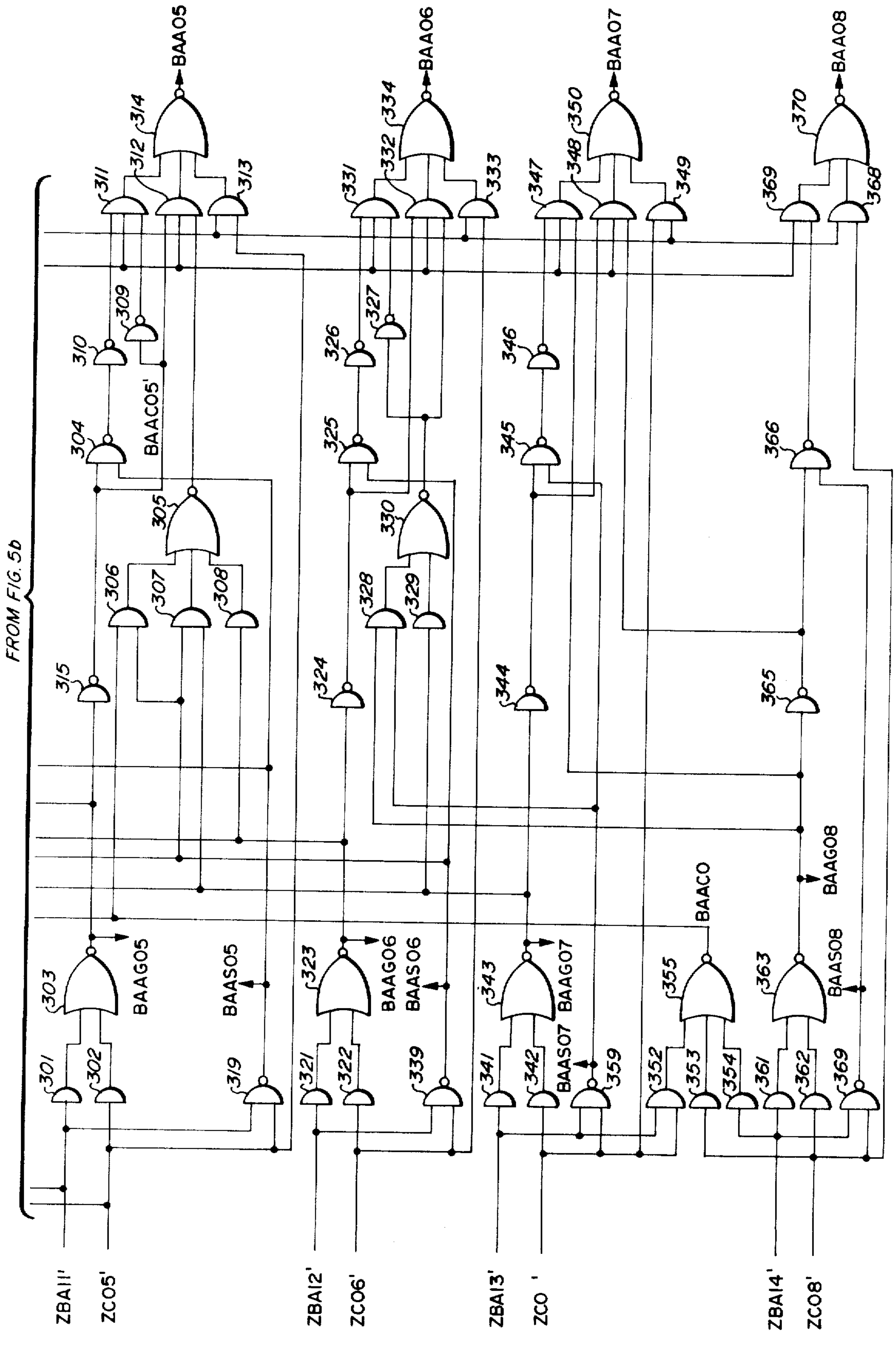
Figure 6:
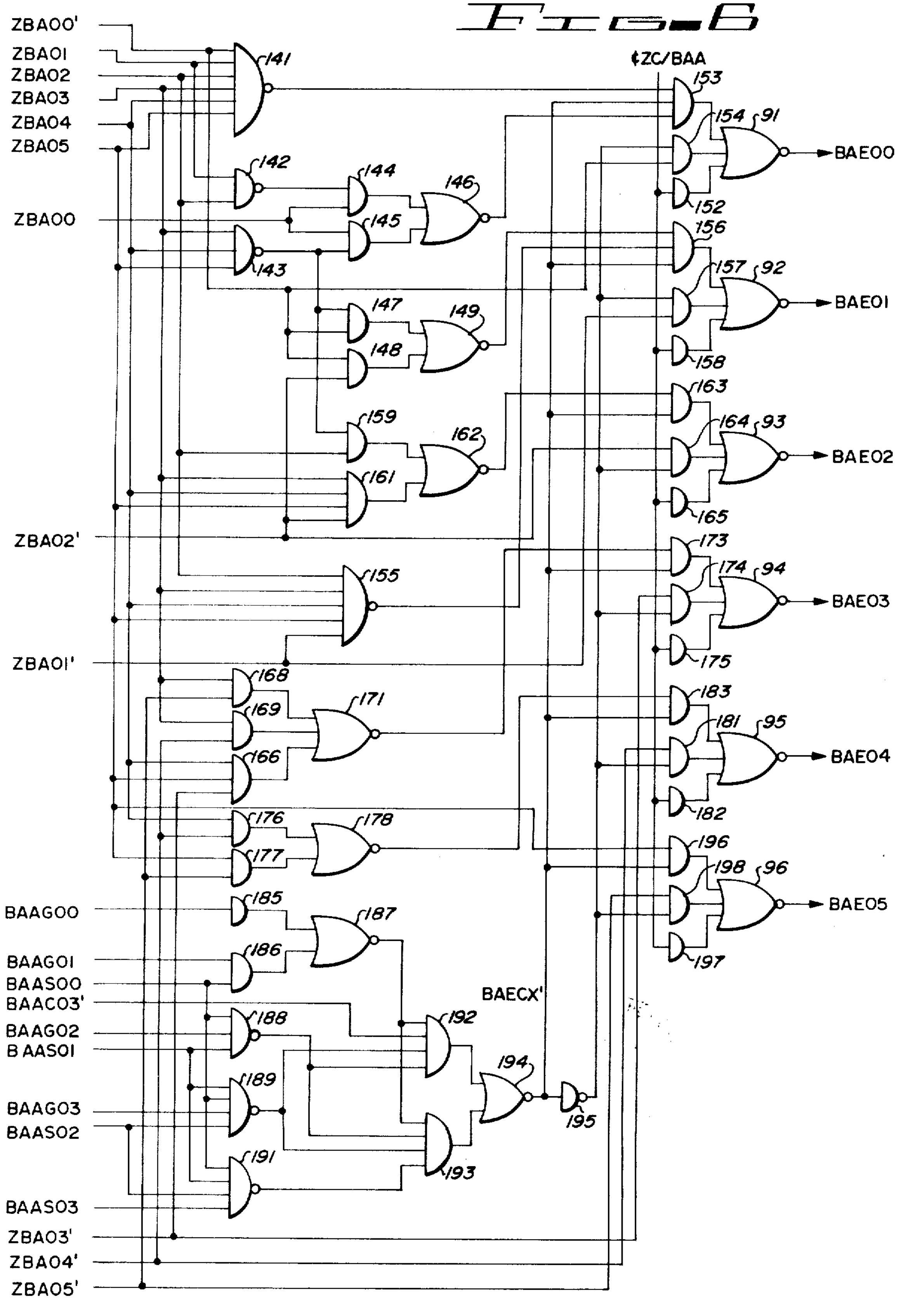

FIG. 4 is a logic diagram which includes the first bit stage of the ZBA switch 160. Gates 61–66 implement the equations:

$$ZBA00' = (DSEL\text{-}EXT \cdot REXT00 + DSEL\text{-}MBA \cdot RMBA00 + DSEL\text{-}MBB \cdot RMBB00 + 0)' \text{ and } ZBA00 = (ZBAA00')'$$

where the primes represent complementation. The control signals are generated from the existing control signals ADD-BASE, RIWR009, the 10th bit of the instruction register 78, and PIA. The register selecting signals are generated as follows:

$$DSEL\text{-}BAR = DSEL\text{-}EXT - ADD\text{-}BASE$$
$$DSEL\text{-}MBB = PIWR009 \cdot \overline{PIA} \cdot \overline{ADD\text{-}BASE}$$
$$DSEL\text{-}MBA = \overline{ADD\text{-}BASE} \cdot \overline{SEL\text{-}MBB}$$

The lower order bits are formed in the same manner.

The control signal RIWR009 is derived from the decode logic 79 and represents the state of decoding an operation code which belongs to the class of operation codes which use the MBB register for forming the absolute address of the operand. The gates 31,33,35 and 39 operate as a pair of flip-flops which indicate the state of the computer. Gates 36 and 39 generage FTEMP-MSTR which represents a temporary master mode or supervisory state and which is usually followed by the gates 31 and 33 representing with FMSTR/SLVE, a master mode state for a longer period of time. Accordingly, gate 43, in response to gates 31,33,35 and 39, generates DADD-BASE' which represents (when complemented) that a non-master mode or slave state exists during which the BAR base register and the EXT register are used for address modification. In the master mode, either the MBA or MBB register is used (unless a hard core monitor address is specified) for address modification. The control logic 41 sets and resets FMSTR/SLVE and FTEMP-MSTR, generally in accordance with program execution. When in the master mode, the transition of the slave mode is normally the result of executing a RETURN instruction or TSS (transfer and set slave). When in the slave mode, the transition to the master mode is normally the result of encountering an interrupt or fault condition. The computer system fetches instructions in pairs and after each fetch, another instruction pair is fetched in accordance with the IC register, in the absence of a branch type condition. The control logic 41 generates a signal PIA' which represents that no such address preparation for a sequential instruction pair fetch is called for. Accordingly, gates 51 and 59 select the MBB register when the computer is in the master mode, a sequential instruction fetch is not called for, and an instruction is being executed which is in the class of instructions which specify the MBB register. Similarly, gates 51,54 and 58 select the MBA register when the computer is in the master mode and the MBB register is not specified. Control logic 41 also generates $BAR, $MBA, $MBB and $EXT for gating the respective registers when an instruction is being executed which specifies that that register is to be loaded, in accordance with the operation code in instruction register 78 as decoded by decoding logic 79. When in the master mode, gates 43,44,47 and 49 provide an overriding switching control of the address preparation. When the two most significant bits are all zero and the computer is in master mode, the MBA register selection is overridden and the effective address from the ZY switch is selected as the absolute address.

In FIGS. 5*a–c* and 6, the logic circuitry for the base address adder 170 is shown for selectively adding a base register address from the ZBA switch 160 to the initial address on lines ZC00–08 from the ZC switch 19. For the least significant bit, gates 361–363 and 369 form the elementary generate and sum factors:

BAAG08 = (ZC08′ + ZBA14′)′ = ZC08·ZBA14

BAAS08 = (ZC08′·ZBA14′)′ = ZC08 + ZBA14

Gates 365–370 form the least significant bit:

BAA08 = [ ¢ ZC/BAA·ZC08′ + ¢BA/BAA·(BAAG08′·BAAS08)′]′ = ¢ZC/BAA·ZC08 + ¢ BA/BAA·BAAG08′·BAAS08 since ¢ZC/BAA = ¢BA/BAA′ and ¢BA/BAA = ¢ZC/BAA′. Gates 352–355 form the intermediate carry look-ahead factor:

BAA(0 = (ZC07′·ZBA13′ + ZC08′ + ZBA14′)′ = (ZC07 + ZBA13) (ZC08·ZBA14). For the next significant bit, gates 341–343 and 339 form the elementary generate and sum factors BAAG07 and BAAS07 in the same manner as for the least significant bit. Gates 344–350 form the desired second bit:

BAA07 = ( ¢ ZC/BAA·ZC07′ + ¢BA/BAA·BAAG07′·BAAG08′ + ¢BA/BAA·[(BAAG07′·BAAS07)′]′·BAAG08)′ = ¢ZC/BAA·ZC07 + ¢ BA/BAA [(BAAG07′·BAAS07) ⊕BAAG08]

For the next significant bit, gates 321–323 and 339 form the generate and sum factors BAAG06 and BAAS06. Gates 328–330 form a carry look-ahead term:

BAAC06′ = (BAAG07 + BAAS07·BAAG08)′

Gates 309–314 form the third bit:

BAA06 = [ ¢ ZC/BAA·ZC06′ + ¢BA/BAA·BAAG06·BAAC06′ + ¢ BA/BAA [(BAAG06·BAAS06)′]′(BAA06′)]′ = ¢ZC/BAA·ZC06 + ¢BA/BAA[(BAAG06′·BAAS06) ⊕BAAC06]

In a similar manner gates 301–303, 319, 281–283, 299, 261–263, 279, 241–243, 259, 221–223, 239, 201–203 respectively form the generate and sum factors BAAG05, BAAS05, BAAG04, BAAS04, BAAG03, BAAS03, BAAG02, BAAS02, BAAG01, BAAS01, BAAG00 and BAAS00. Gates 306–308 and 316 form the carry-look-ahead factor for bit four:

BAAC05′ = (BAAG06 + BAAS06·BAAG07 + BAAS06·BAAC0)′ and gates 304–315 generate bit four:

BAA05 = [ ¢ ZC/BAA·ZC05′ + ¢BA/BAA·BAAG05′·BAAC05′ + ¢BA/BAA·[(BAAG05′·BAAS05)′]′·(BAAC05′)′]′ = ¢ ZC/BAA·ZC05 + ¢ BA/BAA [(BAAG05′·BAAS05) ⊕BAAC05]

Gates 288–292 form the carry look-ahead factor for bit four:

BAAC04′ = (BAAG05 + BAAS05·BAAG06 + BAAS05·BAAS06·BAAG07 + BAAS05·BAAS06·BAAC0)′ and gates 284–287 and 293–296 form bit five in the same manner as bit four is formed, hence:

BAA04 = ¢ ZC/BAA·ZC04 + ¢ BA/BAA·[(BAAG04′·BAAS04) ⊕BAAC04]

The remaining output bits BAA00–03 are formed in the same manner as bits BAA04 using gates 264–267, 276–278, 270, 244, 245, 251–253, 258, 224, 225, 231––236, 204, 205 and 213–218.

BAA0*i* = ¢ ZC/BAA·ZC0*i* + ¢ BA/BAA·[(BAAG0*i*′·BAAS0*i*) ⊕ BAAC0*i*], *i* = 0,1,2,3

The carry look-ahead factor for bit six is generated by gates 271–275:

BAAC03′ = (BAAG04 + BAAS04·BAAG05 + BAACX·BAAG06 + BAACX·BAAS06·BAAG07 + BAACX·BAAS06·BAAC0)′ where BAACX is formed by gates 268–270:

BAACX = (ZC04′·ZBA10′ + ZC05′·ZBA11′)′ = (ZC04 + ZBA10) (ZC05 + ZBA11)

The carry look-ahead factor for bit seven is formed by gates 246–248 and 254:

BAAC02 = (BAAG03′·BAAC03′ + BAAS03′·BAAG03′)′ = BAAG03 + BAAC03·BAAS03

The carry look-ahead factor for bit one is formed by gates 226–230:

BAAC01 = [BAAG02′·BAAC03′·(BAAS02·BAAG03)′ + (BAAG02′·(BAAS02·BAAS03)′·(BAAS02·BAAG03)′]′ = BAAG02 + BAAS02·BAAG03 + BAAS02·BAAS03·BAAC03

The carry look-ahead factor for bit eight if formed by gates 207–212:

BAAC00 = [(BAAS01·BAAG02)′·(BAAS01·BAAS02·BAAG03)′·BAAG01′·BAAC03′ + (BAAS01·BAAG02)′·(BAAS01·BAAS02·BAAG03)·BAAG01′·(BAAS01·BAAS02·BAAS03)′]′ = BAAG01 + BAAS01·BAAG02 + BAAS01·BAAS02·BAAG03 + BAAS01·BAAS02·BAAS03·BAAC03

For the six most significant bits BAE00–05, the only carry factor occurs from the carry out for the next less significant bit eight, which simplifies the logic of FIG. 7. For the least significant bit BAE05, the output bit is formed by gates 96 and 196–198:

BAE05 = ( ¢ZC/BAA + BAECX′·ZBA05′ + BAECX·ZBA05)′ = ¢ ZC/BAA′·(BAECX ⊕ ZBA05)

where BAECX is formed by gates 185–195:

BAECX = [(BAAG00 = BAAS00·BAAG01)′·BAAC03′·(BAAS00·BAAS01·BAAG02)′·(BAAS00·BAAS01·BAAS02·BAAG03) + (BAAG00 + BAAS00·BAAG01)′·(BAAS00·BAAS01·BAAG02)′·(BAAS00·BAAS01·BAAS02·BAAG03)′·(BAAS00·BAAS01·BAAS02·BAAS03)′]′ = BAAG00 + BAAS00·BAAG01 + BAAS00·BAAS01·BAAG02 +

BAAS00·BAAS01·BAAS02·BAAG03 + BAAS00·BAAS01·BAAS02·BAAS03·BAAC03

BAE04 is formed by gates 95, 176–178 and 181–183:

BAE04 = ( ¢ZC/BAA + ZBA04'·BAECX' + (ZBA04·ZBA05' + ZBA04'·ZBA05)'·BAECX)' = ¢ZC/BAA'·[(ZBA04 ⊕ ZBA05)·BAECX + ZBA04·BAECX']

BAE03 is formed by gates 94, 166, 168, 169, 171 and 173–175:

BAE03 = [ ¢ZC/BAA + ZBA03·BAECX' + (ZBA03·ZBA04' + ZBA03·ZBA05' + ZBA03'·ZBA04·ZBA05)'·BAECX]' = ¢ZC/BAA'·[(ZBA03 ⊕ (ZBA04·ZBA05)]·BAECX + ZBA03·BAECX')

BAE02 is formed by gates 93, 159 and 161–165:

BAE02 = [ ¢ZC/BAA + ZBA02'·BAECX' + [(ZBA03·ZBA04·ZBA05)'·ZBA02 + ZBA02'·ZBA03·ZBA04·ZBA05]·BAECX]' = ¢ZC/BAA'·[(ZBA02 ⊕ (ZBA03·ZBA04·ZBA05)]·BAECX + ZBA02·BAECX']

BAE01 is formed by gates 92, 147–148 and 155–158:

BAE01 = [ ¢ZC/BAA + [(ZBA03·ZBA04·ZBA05)'·ZBA01 + ZBA02'·ZBA01]·(ZBA01'·ZBA02·ZBA03·ZBA04·ZBA05)'·BAECX + ZBA01'·BAECX']' = ¢ZC/BAA'·[(ZBA01 ⊕ (ZBA02·ZBA03·ZBA04·ZBA05)]·BAECX + ZBA01·BAECX']

BAE00 is formed by gates 91, 142, 144–146 and 151–153:

BAE00 = ¢ZC/BAA + ZBA00·BAECX' + [(ZBA03·ZBA04·ZBA05)·ZBA00·(ZBA01·ZBA02)·(ZBA00'·ZBA01·ZBA02·ZBA03·ZBA04·ZBA05)'·BAECX]' = ¢ZC/BAA'·[(ZBA00 ⊕ (ZBA01·ZBA02·ZBA03·ZBA04·ZBA05)]·BAECX + ZBA00·BAECX')

There are four basic ways of forming the absolute address Y using the extended addressing capability and the effective address Y, namely:

1. $Y = Y + (BAR)$
2. $Y = Y + (MBA)$
3. $Y = Y + (MBB)$
4. $Y = Y$

When executing a user or slave program, relation (1) is used in essentially the same manner as address preparations without extended addressing. Similarly, when executing instructions in the core resident operating system (the hard-core monitor), relation (4) is used so that the effective address and the absolute address are identical. When in master mode, but not in the hard core monitor, either relation (2) or (3) may be used. If the two most significant bits of the effective address are non-zero, relation (2) is used. If and only if the operation code of an instruction being executed belongs to a family dedicated to MBB address modification and the two most significant bits of the effective address are non-zero, then relation (3) is used.

Accordingly, the transitions between a slave (or user) program and a supervisory (or master mode) program are achieved without requiring an extra base address register change and a base address register save. Furthermore, when in the master mode, there are effectively three base register options available which require no extra base address changes nor any base address register saves and which require no extension of the address preparation time.

It is understood that the invention should not be construed as being limited to the form of embodiment described and shown herein which has been given by way of example only, as many modifications and variations may be made by those skilled in or conversant in the art without departing from the gist and scope of the invention.

What is claimed is:

1. An extended memory address formation system in a digital computer system which generates an address for a main memory address register comprising:

A. a base address register for storing high order address bit signals;

B. an extended base address register for storing high order address bit signals and combined with said base address register for extending the address span of the computer to address the expanded portion of the expanded memory;

C. an instruction register for storing instructions to be executed by the computer in low order address bit positions;

D. a plurality of master base registers, each storing high order address bit signals to provide an address span greater than the span of the instruction register address field;

E. an address adder, selectively connected to said base address register, said extended base address register, and said master base register and connected to said instruction register, such that the high order instruction bits are selectively modified or not by the selection of the low order address bits from either the combined base and extended base address register, said instruction register and said plurality of master base register with the extended address bits remaining unchanged except for a possible carry from the added bit for generating an absolute address;

F. logic means responsive to at least one bit in the address field of said instruction register for selectively gating said combined base and extended base registers, said instruction register and each of said plurality of master bar registers to become the extended memory address for the digital computer system.

2. An extended memory address formation system as described in claim 1 wherein the address signals from said base and extended base combination address register and from said plurality of master base registers are connected to said adder such that the lowest order bit signal from these registers is added to the modulo 512 address bit signal of the instruction register and each higher order bit signal is added, with carry, in turn to a high order effective address signal.

3. In a digital computer having a central processor including an accumulator register and an instruction register for holding low order address bit signals defining computer instructions and having an address field, said central processor further comprising:

A. decoding means, connected to the instruction register for detecting a non-zero condition in at least one of the most significant digit positions in the address field of the instruction register;

B. a base register and an extended address register for storing the initial address of a user program in high order address bit signals, said extended address register storing the extended address bit signals required to address the expanded portion of an expanded memory store of the digital computer;

C. a plurality of master mode registers for storing high order address bit signals of the initial address of areas of memory for system programs for use with user programs;

D. a master and slave mode indicator;

E. an adder, selectively connected to said plurality of master mode registers, the instruction register, and said extended and base registers, and controlled by said decoding means, and said master and slave mode indicator, for combining the address signals such that the high order instruction address bits are selectively modified or not by the low order address bits from one of said plurality of master mode registers or said extended and base registers with the extended address bits remaining unchanged except for a possible carry from the added bit, said adder being activated by the detection of a master mode operation and said decoding means to allow the combining of address signals from one of said plurality of master base address registers to the address signals from the instruction register, said adder also responsive to said master mode indicator on load and store instructions to combine address signals from one of the remaining master base address registers with address signals from the instruction register, said adder not combining address signals with said instruction register address signals in response to said master mode indicator with an inactivated decoding means, and said adder being responsive to said slave mode indicator to combine address signals of said base and extended register and said instruction register.

4. A central processor as described in claim 3 wherein the address signals from said base and extended base combination address register and from said plurality of master base registers are connected to said adder such that the lowest order bit signal from these registers is added to the modulo 512 address bit signal of the instruction register and each higher order bit signal is added, with carry, in turn to a high order effective address signal.

5. An extended addressing mechanism for a digital computer comprising:

A. an instruction register for storing low order address bit signals of computer instruction words having an address field of *n* bits and an operation code field;

B. extended address sensing logic responsive to a part of the address field portion of said instruction register for generating a selection signal representing a non-zero value for at least one bit in the address field;

C. effective address gating means, connected to said instruction register, for selectively obtaining an effective address therefrom;

D. an adder for generating absolute memory addresses and adapted to selectively receive the output of said effective address gating means;

E. a base address register for storing high order base address bit signals;

F. absolute address gating means for selectively connecting said base register to said adder as a part of the second adder input in such a manner that the most significant bit of said base address register is added to the most significant bit of the instruction address;

G. an instruction count register connected to said effective address gating means for providing an alternative selectable effective address;

H. an extension address register connected to said absolute address gating means in such a manner that the address from said base address is augmented, said extension address register storing high order address bits for addressing an extended section of a memory store;

I. a plurality of master base address registers, connected to said absolute address gating means, each storing high order address bit signals for providing an alternative address modification to that provided by said extension address register and base address register combination; and J. instruction decoding means, responsive to the operation code field of said instruction register for detecting a master mode load or store instruction and accordingly controlling said absolute address gating means;

said absolute address gating means activated by the detection of a master mode operation with an effective address larger than the size of the memory store storing the computer operating system program and responsive thereto to allow the transfer of address signals from one of said plurality of master base address registers, said absolute address gating means also responsive to said instruction decoding means to allow transfer of address signals from one of the remaining master base address registers, said absolute address gating means preventing transfer of any address signals in response to the detection of a master mode operation with an effective address lesser than the size of the operating system storage area, and said absolute address gating means being responsive to a slave mode to allow transfer of said extended address register and base address register combination.

6. An extended addressing mechanism as described in claim 5 wherein the address signals from said base and extended base combination address register and from said plurality of master base registers are connected to said adder such that the lowest order bit signal from these registers is added to the modulo 512 address bit signal of the instruction register and each higher order bit signal is added, with carry, in turn to a high order effective address signal.

* * * * *